United States Patent
Yamada

(10) Patent No.: US 7,221,122 B2
(45) Date of Patent: May 22, 2007

(54) INVERTER CONTROL DEVICE

(75) Inventor: Takahiro Yamada, Nagoya (JP)

(73) Assignee: DENSO Corporation, Kariya (JP)

(*) Notice: Subject to any disclaimer, the term of this patent is extended or adjusted under 35 U.S.C. 154(b) by 0 days.

(21) Appl. No.: 11/389,245

(22) Filed: Mar. 27, 2006

(65) Prior Publication Data

US 2006/0214623 A1    Sep. 28, 2006

(30) Foreign Application Priority Data

Mar. 28, 2005    (JP)    ............... 2005-092574

(51) Int. Cl.
*H02P 23/00*    (2006.01)
(52) U.S. Cl. ............... 318/807; 318/801; 318/802
(58) Field of Classification Search ............... 318/801, 318/802, 805, 806, 807, 254, 138, 434; 363/16, 363/71
See application file for complete search history.

(56) References Cited

U.S. PATENT DOCUMENTS

2005/0281060 A1 * 12/2005 Saren .................. 363/16

FOREIGN PATENT DOCUMENTS

JP    A 2000-316284    11/2000

\* cited by examiner

*Primary Examiner*—Karen Masih
(74) *Attorney, Agent, or Firm*—Oliff & Berridge, PLC

(57) ABSTRACT

An inverter control device controls the operation of an inverter connected to an electric motor. A switching vector SV is determined as an output switching vector SVo to be supplied to the inverter based on a current deviation of the coil winding of each phase of the electric motor and a switching vector determination table. A keeping time TK is calculated based on a torque and a revolution speed of the electric motor. The counting of a time counting is then initiated. In a high revolution speed (TK>Selection time TS), the control operation for the inverter returns to a start step after the elapse of a certain time period that is set in advance. In a low revolution speed of the electric motor (TK<TS), a zero vector is newly selected as the output switching vector SVo after the elapse of the keeping time TK. The control operation for the inverter then returns to the start step after the elapse of the selection time period TS.

18 Claims, 12 Drawing Sheets

FIG. 3A

VECTOR DETERMINATION TABLE

| OUTPUT OF CURRENT DEVIATION DETECTION SECTION | | | SWITCHING VECTOR SV |
|---|---|---|---|
| du | dv | dw | |
| 0 | 0 | 0 | V0 |
| 0 | 0 | 1 | V1 |
| 0 | 0 | 2 | V1 |
| 0 | 1 | 0 | V2 |
| 0 | 1 | 1 | USING PRECEDING SV |
| 0 | 1 | 2 | V1 |
| 0 | 2 | 0 | V2 |
| 0 | 2 | 1 | V2 |
| 0 | 2 | 2 | V3 |
| 1 | 0 | 0 | V4 |
| 1 | 0 | 1 | USING PRECEDING SV |
| 1 | 0 | 2 | V1 |
| 1 | 1 | 0 | USING PRECEDING SV |
| 1 | 1 | 1 | V0 |
| 1 | 1 | 2 | USING PRECEDING SV |
| 1 | 2 | 0 | V2 |
| 1 | 2 | 1 | USING PRECEDING SV |
| 1 | 2 | 2 | V3 |
| 2 | 0 | 0 | V4 |
| 2 | 0 | 1 | V4 |
| 2 | 0 | 2 | V5 |
| 2 | 1 | 0 | V4 |
| 2 | 1 | 1 | USING PRECEDING SV |
| 2 | 1 | 2 | V5 |
| 2 | 2 | 0 | V6 |
| 2 | 2 | 1 | V6 |
| 2 | 2 | 2 | V0 |

FIG. 3B

| SWITCHING VECTOR SV | 3 PHASE OUTPUT (u, v, w) |
|---|---|
| V0 | (0, 0, 0) |
| V1 | (0, 0, 1) |
| V2 | (0, 1, 0) |
| V3 | (0, 1, 1) |
| V4 | (1, 0, 0) |
| V5 | (1, 0, 1) |
| V6 | (1, 1, 0) |
| V7 | (1, 1, 1) |

FIG. 9A
VECTOR DETERMINATION TABLE

| OUTPUT OF CURRENT DEVIATION DETECTION SECTION | | | SWITCHING VECTOR SV |
|---|---|---|---|
| du1 | dv1 | dw1 | |
| 0 | 0 | 0 | V0 |
| 0 | 0 | 1 | V1 |
| 0 | 0 | 2 | V1 |
| 0 | 1 | 0 | V2 |
| 0 | 1 | 1 | USING PRECEDING SV |
| 0 | 1 | 2 | V1 |
| 0 | 2 | 0 | V2 |
| 0 | 2 | 1 | V2 |
| 0 | 2 | 2 | V3 |
| 1 | 0 | 0 | V4 |
| 1 | 0 | 1 | USING PRECEDING SV |
| 1 | 0 | 2 | V1 |
| 1 | 1 | 0 | USING PRECEDING SV |
| 1 | 1 | 1 | BASED ON TABLE SHOWN IN FIG. 9B |
| 1 | 1 | 2 | USING PRECEDING SV |
| 1 | 2 | 0 | V2 |
| 1 | 2 | 1 | USING PRECEDING SV |
| 1 | 2 | 2 | V3 |
| 2 | 0 | 0 | V4 |
| 2 | 0 | 1 | V4 |
| 2 | 0 | 2 | V5 |
| 2 | 1 | 0 | V4 |
| 2 | 1 | 1 | USING PRECEDING SV |
| 2 | 1 | 2 | V5 |
| 2 | 2 | 0 | V6 |
| 2 | 2 | 1 | V6 |
| 2 | 2 | 2 | V0 |

FIG. 9B
AUXILIARY TABLE

| OUTPUT OF CURRENT DEVIATION DETECTION SECTION | | | SWITCHING VECTOR SV |
|---|---|---|---|
| du2 | dv2 | dw2 | |
| 1 | 1 | 1 | V0 |
| OTHER PATTERNS | | | USING PRECEDING SV |

"INVERTER CONTROL DEVICE

CROSS-REFERENCE TO RELATED APPLICATIONS

This application is related to and claims priority from Japanese Patent Application No. 2005-92574 filed on Mar. 28, 2005, the contents of which are hereby incorporated by reference.

BACKGROUND OF THE INVENTION

1. Field of the Invention

The present invention relates to an inverter control device based on instruction current follower control capable of controlling the operation of an inverter having a three phase bridge circuit by selecting an optimum switching vector so that a detected current value of a coil winding of each phase follows a given instruction current value.

2. Description of the Related Art

There have been various inverter control devices for controlling the operation of an inverter that drives an electric motor and an electric generator. FIG. 12A is a block diagram showing a configuration of an inverter to be controlled by an inverter control device of a related art. FIG. 12B is a block diagram showing a circuit configuration of the inverter control circuit of the related art. The inverter control device based on instruction current follower control is well known as one of the control devices. Such an inverter control device of a related art has a configuration shown in FIG. 12B.

The inverter control device shown in FIG. 12B selects an optimum switching vector so that a detected current value follows a given instruction current value so as to control the operation of the inverter shown in FIG. 12A, The inverter shown in FIG. 12A is made of a three phase bridge circuit. In FIG. 12A, reference character "MG" means an electric motor and an electric generator. For brevity, the term "the electric motor MG" will be used for both the electric motor and the electric generator through the following description.

First, the inverter 101 to be controlled, as the target in control, has a direct current (DC) power supply 103, a smoothing capacitor 105, a three phase bridge circuit 107, and a current detection circuit 109.

The smoothing capacitor 105 smoothes the voltage of the DC power supply 103 to be supplied to the three phase bridge circuit 107. The three phase bridge circuit 107 receives the electric power from the DC power supply 103 through the power source lines and supplies the current to the coil winding of each of the phases U, V, and W of the electric motor MG. The current detection circuit 109 detects the magnitude of the current supplied from the three phase bridge circuit 107 to the coil winding of each of the phases U, V, and W of the electric motor MG.

The switching elements SWa and SWb are connected in series to make a pair, the switching elements SWc and SWd are connected in series to make a pair, and the switching elements SWe and SWf are connected in series to make a pair.

The three phase bridge circuit 107 has six reflux current diodes and the six switching elements SWa to SWf. Each switching element and the corresponding reflux diode are connected in inversely parallel connection. Three pairs of the switching elements SWx (x=a, b, c, d, e, and f) are arranged in parallel to each other. Between the positive electrode and the negative electrode of the DC power supply 103, the three pairs of the switching elements SWx are connected in parallel. Each pair of the switching elements is connected to the coil winding of each of the corresponding phases U, V, and W of the electric motor, respectively.

Next, the inverter control device 110 has a current deviation detection section 111, a switching vector determination section 113, and a driving signal generation section 117. The current deviation detection section 111 detects deviations between the detection current values and the current instruction values given in advance for each phase, and outputs detection signals du, dv, and dw that indicate the deviations (as current deviation) between the current values iu, iv, and iw detected by the current detection circuit 109 and current instruction values iu*, iv*, and iw*, respectively.

The switching vector determination section 113 determines a switching vector SV according to the deviation signals du, dv, and dw detected by the current deviation detection section 111. The driving signal generation section 117 generates driving signals UP, UN, VP, VN, WP, and WN with which the switching elements SWa to SWf forming the three phase bridge circuit 107 are switched according to the switching vector SV determined by the switching vector determination section 113.

Reference character XP designates the driving signals to be transferred to the switching elements SWp (p=a, c, and e, namely SWa, SWc, and SWe) connected to the positive electrode of the X phase (X=U, V, and W) of the electric motor MG. Reference character XN designates the driving signals to be transferred to the switching elements SWn (n=b, d, and f, namely SWb, SWd, and SWf) connected to the negative electrode of the X phase (X=U, V, and W) of the electric motor MG.

The driving signal generation section 117 generates the driving signals that set one switching element to ON and the other switching element to OFF in each pair of the switching element SWp and SWn (namely, in each of the pair of SWa and SWb, the pair of SWc and SWd, and the pair of SWe and SWf). Further, the driving signal generation section 117 generates the driving signals that set both the switching elements in each pair to OFF (as a dead time) when the ON/OFF state is switched.

The switching vector SV represents an arrangement of switching state of the switching elements SW corresponding to the phases U, V, and W, where reference number "1" indicates ON state of the switching element SWp (p=a, c, and e) connected to the positive electrode of the X phase (X=U, V, and W) of the electric motor MG, and reference number "0" denotes ON state of the switching element SWn (n=b, d, and f) connected to the negative electrode of the X phase (X=U, V, and W) of the electric motor MG. That is, the switching vector SV represents eights states ($=2^3$).

On driving the inverter 101 under the control of the switching vector SV, the amount of current increases in the phase of the electric motor MG under the ON state "1" and decreases in the phase of the electric motor MG under the OFF state "0". In particular, on driving the inverter 101 under the switching vector SV designated by the states "000" and "111" (hereinafter, referred to as "zero vector"), the change of current in each phase is suppressed because there is no voltage difference between the three phases U, W, and W of the electric motor MG.

In order to avoid any occurrence of unnecessary switching caused by a noise and the like on deciding whether or not the switching vector SV is changed, the inverter control device 110 uses a decision threshold value involving a given hysteresis for deciding the magnitude of a deviation. The inverter control device 101 controls or selects the switching vector so that the current is decreased when a current value detected is larger than an instruction value by ΔI, and on the contrary, the current is changed by increasing the current when the current value detected is smaller than an instruction value by ΔI.

In general, it is well known that the number of switching is increased in a low rotational speed of the electric motor MG by such an inverter control device based on instruction current follower control. This means that the magnitude of the currents such as the currents iu, iv, and iw, flowing through the coil windings of each phase to be driven, are greatly changed to the switching vectors other than the zero vectors "000" and "111" when the rotational speed of the electric motor MG is low and generates a small counter electromotive force. On the contrary, the current instruction values iu*, iv* and iw* take a low frequency waveform of an extremely low change rate. Accordingly, the change rate of the detected current values iu, iv, and iw detected when the ON and OFF of the switching elements SWp and SWn are switched is over the hysteresis width ΔI of the decision threshold value in a moment. As a result, because an excessive large current or an excessive small current are switched in a short time period, the number of the switching is increased.

Increasing the number of switching introduces the increase of switching loss and accordingly because large rated elements must be used as the switching elements SWa to SWf, the degree of freedom in design for the inverter 101 is thereby limited. In fact, it is possible to decrease the number of the switching slightly when the hysterisys width ΔI of the decision threshold value is set to a large value, this causes a problem of increasing a current distortion flowing in the coil windings of each phase of the electric motor MG to be driven.

Further, because the inverter control device involves a drawback to increases the switching loss at a low revolution speed of the electric motor MG, it is difficult to apply such an inverter to the application in which the electric motor operates in a wide range from a low revolution to a high revolution such as an electric motor that is a power source for a hybrid vehicle.

In order to avoid the conventional problem, the Japanese patent laid open publication NO. 2000-316284 as one of conventional well known techniques has disclosed a conventional inverter control device based on a current control in which a current deviation vector using a current deviation selects a zero vector when it is within an error range determined according to current control precision.

Thus, the active use of the zero vector may eliminate the conventional problem described above because it can suppress an excess control to the current and decrease the number of the switching.

In order to make such an inverter control device cheaply, the recent trend is to incorporate in the inverter control device a microprocessor so as to perform digital control for various processes of each configuration element forming the inverter control device. In this case, the response of the inverter control device equipped with a microprocessor is limited by the control period of the microprocessor, in particular, by a sampling period of an analogue to digital (A/D) converter that converts an analogue current value detected to a digital current value. On making the inverter control device cheaply, the microprocessor with a sampling period of several µs is installed in the inverter control device.

However, the conventional technique disclosed in the Japanese patent laid open publication NO. 2000-316284 can not select the zero vector in a low revolution speed of the electric motor MG and as a result it cannot decrease the number of the switching.

In other words, because the current change is increased during the low revolution of the electric motor, it is impossible to detect the state in which the current deviation is within an error range and as a result, the zero vector is not selected.

SUMMARY OF THE INVENTION

It is an object of the present invention to provide a new and improved inverter control device based on instruction current follower control capable of decreasing the number of switching during low revolution of an electric motor and an electric generator. The instruction current follower control is the control for the inverter that is connected to the electric motor by selecting an optimum switching vector so that a detected current value follows an instruction current value.

To achieve the above purposes, the present invention provides an inverter control device that controls an inverter by selecting a switching vector to be supplied to the inverter so that a detection current flowing in a coil winding of each phase of an electric motor follows a specified current value. The inverter control device is capable of determining the switching vector every a given timing in order to decrease the deviation between a current flow value detected in a coil winding of each phase and a given current value, capable of selecting the switching vector until the elapse of a keeping time that is given in advance from the determination time of the switching vector. The inverter control device is capable of selecting a zero switching vector by which a voltage difference between the coil windings of each pair of the phases becomes zero until a determination time to determine the newly switching vector after the elapse of the keeping time. The inverter control device is capable of driving the inverter based on the selected switching vector.

In addition, the present invention provides as another aspect an inverter control device that controls an inverter by selecting a switching vector to be supplied to the inverter so that a detection current flowing in a coil winding of each phase of an electric motor follows a specified current value. The inverter control device has a current deviation detection section, a switching vector determination section, a selection section, and inverter driving section.

The current deviation detection section is configured to detect a current flowing in a coil winding of each phase of the electric motor driven by the inverter, and to obtain a deviation between the current detection value detected and a specified current value that is given in advance per each phase. The switching vector determination section configured to determine the switching vector every a given timing in order to decrease the deviation of each phase obtained by the current deviation detection section. The output switching vector (SV) selection section is configured to select the switching vector determined by the switching vector determination section until the elapse of a keeping time that is given in advance from the time at which the switching vector determination section determined the switching vector, and to selects a zero switching vector by which a voltage difference between each pair of the phases becomes zero until a time at which the switching vector determination section selects a new switching vector after the elapse of the keeping time. The inverter driving section is configured to drive the inverter based on switching vector selected by the switching vector determination section.

Still further, the present invention provides as another aspect an inverter control device that controls an inverter by selecting a switching vector to be supplied to the inverter so that a detection current flowing in a coil winding of each phase of an electric motor follows a specified current value. The inverter control device has a current deviation detection section, a switching vector determination section, an output SV selection section, and an inverter driving section.

The current deviation detection section is configured to detect a current flowing in a coil winding of each phase of the electric motor to be driven by the inverter, and to obtain a deviation between the current detection value and a specified current value that is given in advance per each phase. The switching vector determination section is configured to determine the switching vector in order to decrease the deviation of each phase obtained by the current deviation detection section. The output SV selection section is configured to select the switching vector determined by the switching vector determination section while a zero vector selection condition is not satisfied and to selects a zero switching vector by which a voltage difference between each pair of the phases becomes zero while the zero vector selection condition is satisfied. The inverter driving section is configured to drive the inverter based on the switching vector selected by the output SV selection section. In the inverter control device, the current deviation detection section has a first comparison section and a second comparison section. The first comparison section is configured to output a first medium level, a large level, and a small level as the deviation between the current detection value and the specified current value of each phase. The first medium level indicates that an absolute value of the deviation is smaller than a first specified value set in advance. The large level indicates that the current detection value is not less than the first specified value larger than the current instruction value. The small level indicates that the current detection value is not more than the first specified value smaller than the current instruction value. The second comparison section is configured to output a second medium level and non-second medium level for each phase, in which the second medium level indicating that the absolute value of the deviation is smaller than the second specified value that is smaller than the first specified value. The output SV selection section determines that the zero vector selection condition is satisfied until the time at which the deviation of at least one phase is changed to another level other than the first medium level after the deviation of at least one phase is changed from the second medium level to another level other than the second medium level under the condition in which the current deviation detection section detects that the deviations of all of the phases are the first medium level.

BRIEF DESCRIPTION OF THE DRAWINGS

A preferred, non-limiting embodiment of the present invention will be described by way of example with reference to the accompanying drawings, in which:

FIG. 3A shows a configuration of a vector determination table to be used by a switching vector determination section in the inverter control device according to the first embodiment;

FIG. 3B shows a relationship between the switching vectors and the three phase outputs shown in FIG. 3A;

FIG. 9A shows a vector determination table to be used by a switching vector determination section in the inverter control device according to the second embodiment;

FIG. 9B shows an auxiliary table to be used on selecting a switching vector SV by the switching vector determination section when all of the first deviation signal du1, dv1, and dw1 take the value "1" indicating the middle level;

DETAILED DESCRIPTION OF THE PREFERRED EMBODIMENTS

Figure 1A:
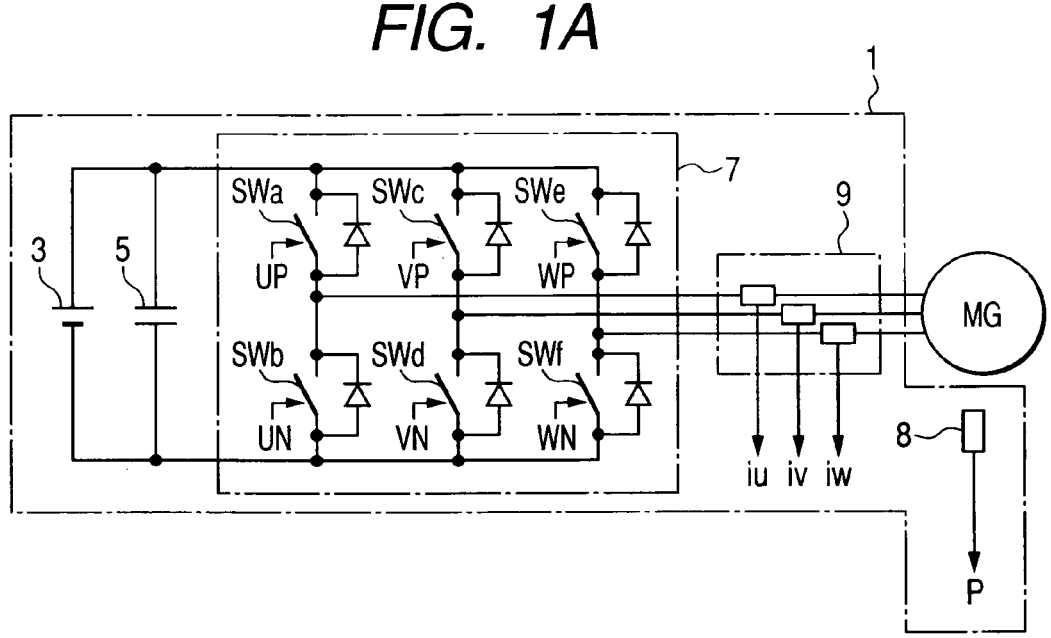
FIG. 1A is a block diagram showing a configuration of an inverter to be controlled by an inverter control device shown in FIG. 1B according to a first embodiment of the present invention.

Hereinafter, various embodiments of the present invention will be described with reference to the accompanying drawings. In the following description of the various embodiments, like reference characters or numerals designate like or equivalent component parts throughout the several drawings.

First Embodiment

Figure 1B:
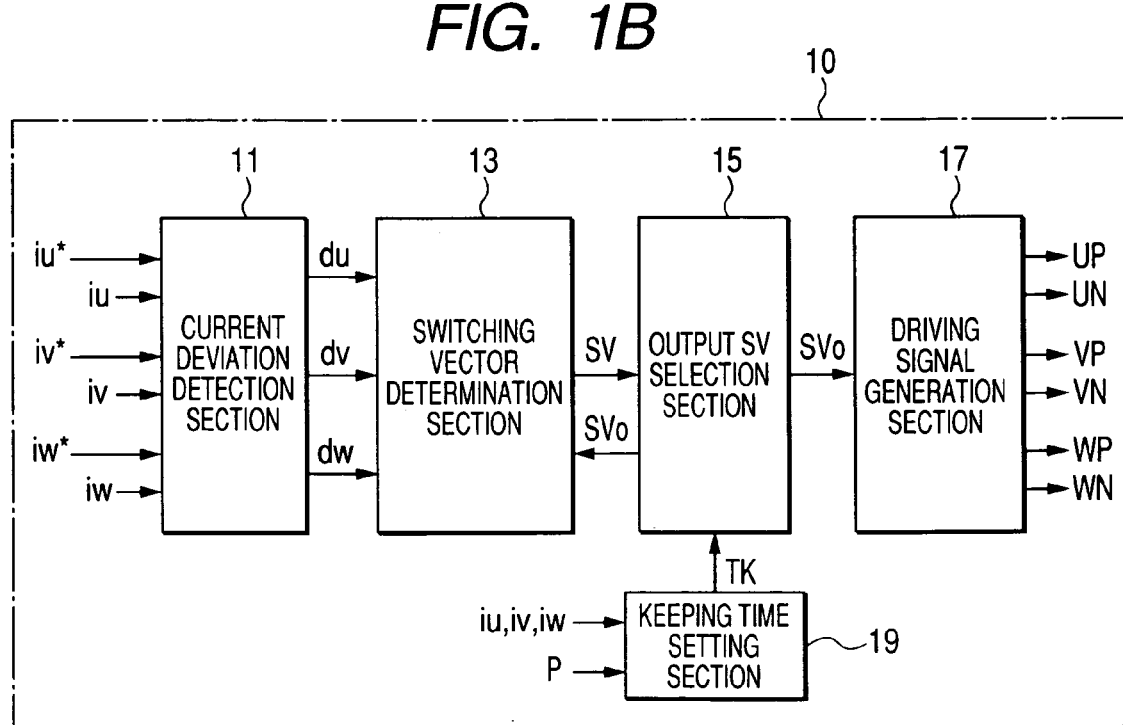
FIG. 1B is a block diagram showing a circuit configuration of the inverter control device according to the first embodiment.

FIG. 1A is a block diagram showing a configuration of an inverter to be controlled by the inverter control device according to the first embodiment of the present invention. FIG. 1B is a block diagram showing a circuit configuration of the inverter control circuit according to the first embodiment.

As shown in FIG. 1A, the inverter 1 to be controlled as a target of control by the inverter control device 10 has a direct current (DC) power supply 3, a smoothing capacitor 5, a three phase bridge circuit 7, a revolution position detection circuit 8, and a current detection circuit 9.

The smoothing capacitor 5 smoothes a main current flowing through power source lines connected to the DC power supply 3. The three phase bridge circuit 7 receives the electric power from the DC power supply 3 through the power source lines and supplies the current to the coil winding of each of the phases U, V, and W of the electric motor MG as an electric load.

The revolution position detection circuit 8 detects the revolution position of the electric motor MG. The current detection circuit 9 detects the magnitude of the current supplied from the three phase bridge circuit 7 to the coil winding of each of the phases U, V, and W.

That is, the switching elements SWa and SWb make a pair connected in series, the switching elements SWc and SWd make a pair connected in series, and the switching elements SWe and SWf make a pair connected in series.

The three phase bridge circuit 7 has six reflux current diodes and six switching elements SWa to SWf. Each switching element and the corresponding reflux current diode are connected in parallel inversely. Three pairs of the switching elements SWx (x=a, b, c, d, e, and f), namely a pair of SWa and SWb, a pair of SWc and SWd, and a pair of SWe and SWf are arranged in parallel to each other. Between the positive electrode and the negative electrode of the DC power supply 3, the three pairs of the switching elements SWx are connected in parallel. Each pair of the switching elements is connected to the coil winding of each of the corresponding phases U, V, and W of the electric motor MG, respectively.

Hereinafter, the switching elements SWp and SWn corresponding to each phase U, V, and W of the electric motor MG will be referred to as the switching element pairs PSU (SWa and SWb), PSV (SWc and SWd), and PSW (SWe and SWf).

Those switching element pairs PSU, PSV, and PSW in the inverter I having the above configuration are so driven that one is activated (as ON) and the remaining are not activated (as OFF). In the phase corresponding to the switching element SWp (p=a, c, or e) under ON connected to the positive electrode of the DC power supply 3, the amount of current flowing in the coil winding of this phase is increased, and on the contrary the switching element SWn (n=b, d, or f) under ON connected to the negative electrode of the DC power supply 3, the amount of current flowing in the coil winding of this phase is decreased. When all of the switching elements SWp connected to the positive electrode of the DC power supply 3 are ON or all of the switching elements SWn connected to the negative electrode of the DC power supply 3 are ON, there is no voltage difference between the phases of the electric motor MG, the magnitude of current flowing in each phase is changed according to the counter electromotive force of the electric motor MG.

The inverter control device 10 has a current deviation detection section 11, an switching vector determination section 13, an output SV (switching vector) selection section 15, a driving signal generation section 17, and a keeping time setting section 19.

The current deviation detection section 11 detects current deviation values du, dv, and dw that are difference values between the current values iu, iv, and iw detected by the current detection circuit 9 and the current instruction values iu*, iv* and iw* that have been given in advance, respectively.

The switching vector determination section 13 determines a switching vector SV according to the deviation signals du, dv, and dw detected by the current deviation detection section 11.

The output SV (switching vector) selection section 15 selects as the output switching vector SVo one of the switching vector SV determined by the switching vector determination section 13 and a zero vector as a switching vector by which the voltage difference between phases of the electric motor MG is set to zero.

The driving signal generation section 17 generates driving signals UP, UN, VP, VN, WP, and WN for switching each of the switching elements SWa to SWf that form the three phase bridge circuit 7.

The keeping time setting section 19 sets a keeping time TK for use in the selection of the output switching vector SVo by the output SV selection section 15 according to the detected current values iu, iv, and iw by the current detection circuit 9 and the detection point P detected by the revolution position detection circuit 8.

Figure 2A:
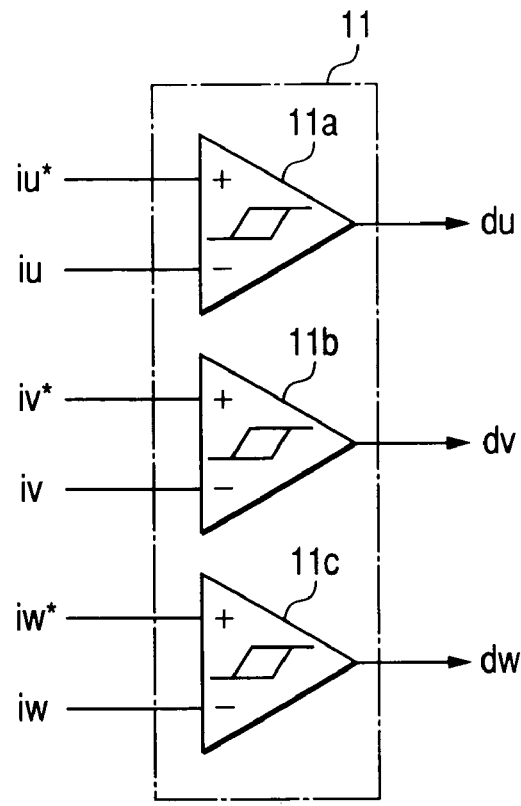
FIG. 2A is a circuit diagram showing a configuration of a current deviation detection section in the inverter control device according to the first embodiment.

As shown in FIG. 2A, the current deviation detection circuit 11 has three comparators 11a to 11c of a three level, each comparator 11a, 11b, and 11c outputs three level outputs. The comparator 11a inputs the current instruction value iu* and the detected current value iu for the U phase and then outputs the deviation signal du corresponding to the difference (iu*−iu) between the levels of those values iu* and iu.

The comparator 11b inputs the current instruction value iv* and the detected current value iv for the V phase and then outputs the deviation signal dv corresponding to the difference (iv*−iv) between the levels of those values iv* and iv.

The comparator 11c inputs the current instruction value iw* and the detected current value iw for the W phase and then outputs the deviation signal dw corresponding to the difference (iw*−iw) between the levels of those values iw* and iw.

Figure 2B:
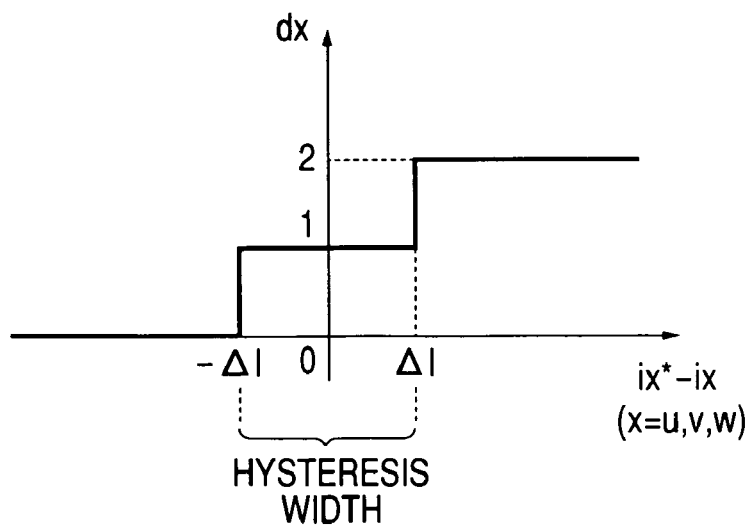
FIG. 2B is a diagram showing output of a three level comparator in the current deviation detection section shown in FIG. 2A.

The deviation signal dx (x=u, v, and w) takes three levels, as shown in FIG. 2B. The three levels are dx=0 (the large level) when $ix^*-ix \leq -\Delta I$, dx=1 (the middle level) when $|ix^*-ix| < \Delta I$, and dx=2 (the small level) when $ix^*-ix \geq \Delta I$, wherein the magnitude of a specified current value is $\Delta I$.

Figure 4:
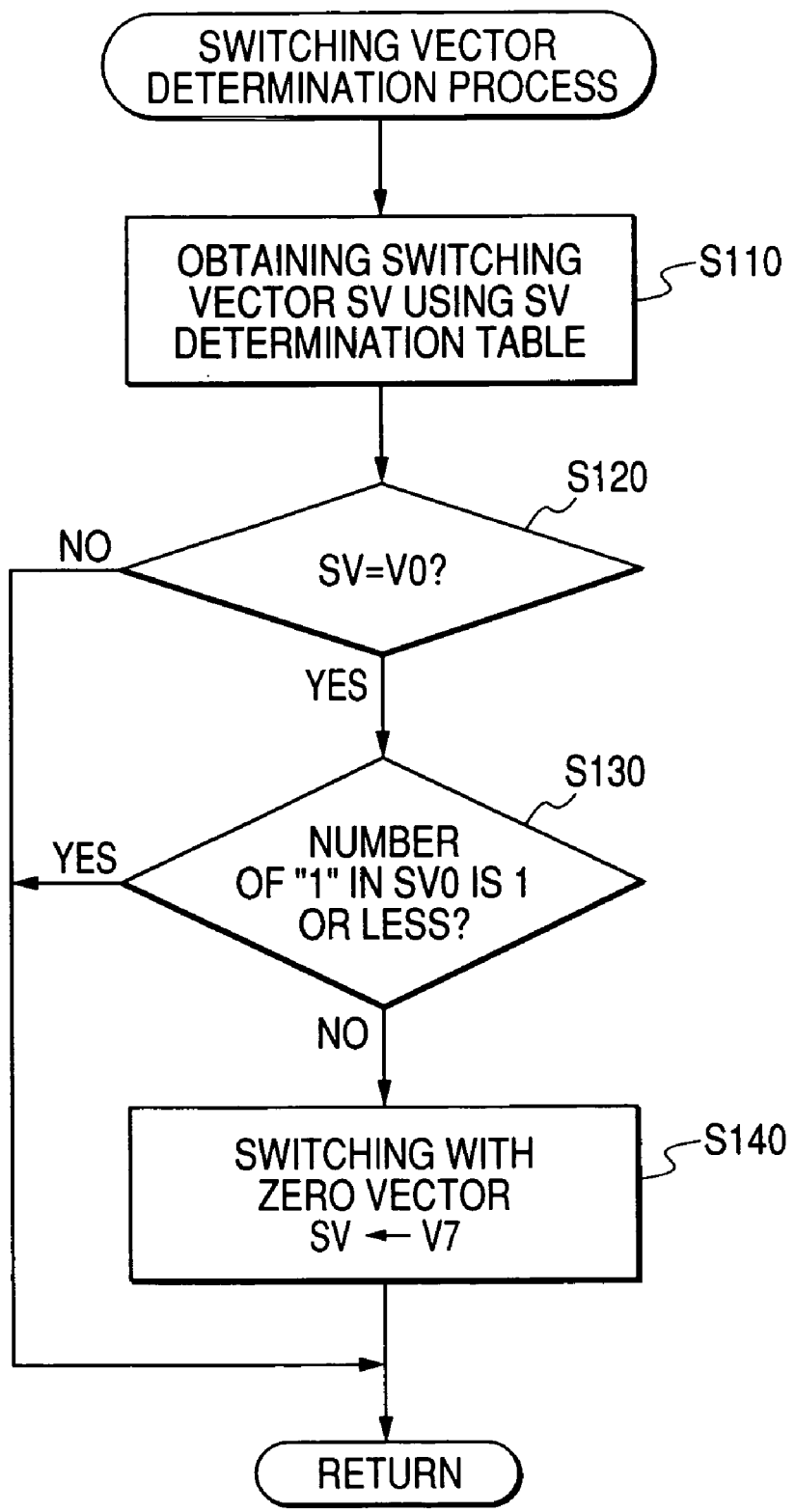
FIG. 4 is a flowchart showing the process of the switching vector determination section in the inverter control device according to the first embodiment.

The switching vector determination section 13 has a vector determination table shown in FIG. 3A therein and performs the switching vector determination process to determine the switching vector SV according to the flow chart shown in FIG. 4.

The switching vector SV (and also the output switching vector SVo) represents an arrangement of switching states of the switching element pairs PSU, PSV, and PSW corresponding to each phase U, V, and W of the electric motor MG, in which the value "1" indicates the ON state of each of the switching elements SWp (p=a, c, and e, namely SWa, SWc, and SWe) connected to the positive electrode of the DC power supply 3, and the value "0" indicates the ON state of each of the switching elements SWn (n=b, d, and f, namely SWb, SWd, and SWf) connected to the negative electrode of the DC power supply 3.

As shown in FIG. 3B, the total number of the switching vector SV is eight such as V0, V1, V2, V3, V4, V5, V6, and V7. In particular, the switching vector V7 (="111") represents that all of the switching elements SWp (p=a, c, and e) connected to the positive electrode of the DC power supply 3 are ON, and the switching vector V0 (="000") represents that all of the switching elements SWn (n=b, d, and f) connected to the negative electrode of the DC power supply 3 are ON. Hereinafter, both the switching vectors V0 and V7 will be referred to as zero vector, and each of the remaining switching vectors V1 to V6 will be referred to as non-zero vector.

The switching vector determinations section 13 selects the zero vector V0 based on the vector determination table shown in FIG. 3A when the deviation signals du, dv, and dw have the same level (000), (111), or (222) to each other, and selects the preceding switching vector SV selected in the preceding selection when two of the deviation signals du, dv, and dw have the value "1" (as the middle level). In the other cases, the switching vector SV is so selected that the current flowing in the phase is decreased when the corresponding deviation signal is zero, and the current flowing in the phase is increased when the corresponding deviation signal is the value "2". FIG. 3A shows the vector determination table including V0 and not including V7 as the zero vector.

As shown in FIG. 4, the switching vector determination section 13 performs the operation regularly every given time interval (every 10 µs in this embodiment) in which the switching vector determination section 13 obtains the switching vector SV in the vector determination table according to the deviation signals du, dv, and dw output from the current deviation detection section 11 (S110).

The switching vector determination section 13 judges whether or not the switching vector SV obtained in the step S110 is the zero vector (S120). The judgment result in the step S120 indicates that it is the zero vector V0, the switching vector determination section 13 refers the output switching vector SVo selected by the output SV selection section 15 in order to count the number of the value "1" included in the output switching vector SVo (S130).

If the counted value indicates that the output switching vector SVo includes the value "1" of more than 1 (namely, not less than two), the switching vector SV (that is, the zero vector V0 of all zero) obtained in the step S110 is replaced with the zero vector V7 of all "1" (S140). The operation is thereby completed.

If the obtained switching vector SV is not the zero vector V0 in the step S120, namely it is not the zero vector V0, or if the counted value indicates that the output switching vector SVo includes the value "1" of not more than 1 (namely, 1 or zero), the operation is completed.

When the switching vector SV obtained in the step S110 is the zero vector V0 and the number of the value "0" in the output switching vector SVo is not less than two, the zero vector V0 is selected. Further, when the switching vector SV selected in the step S110 is the zero vector V0 and the number of the value "1" is not less than two, the switching vector determination section 15 selects the zero vector V7 in order to set the number of switching by the switching elements SWa to SWf to the minimum value.

Figure 5:
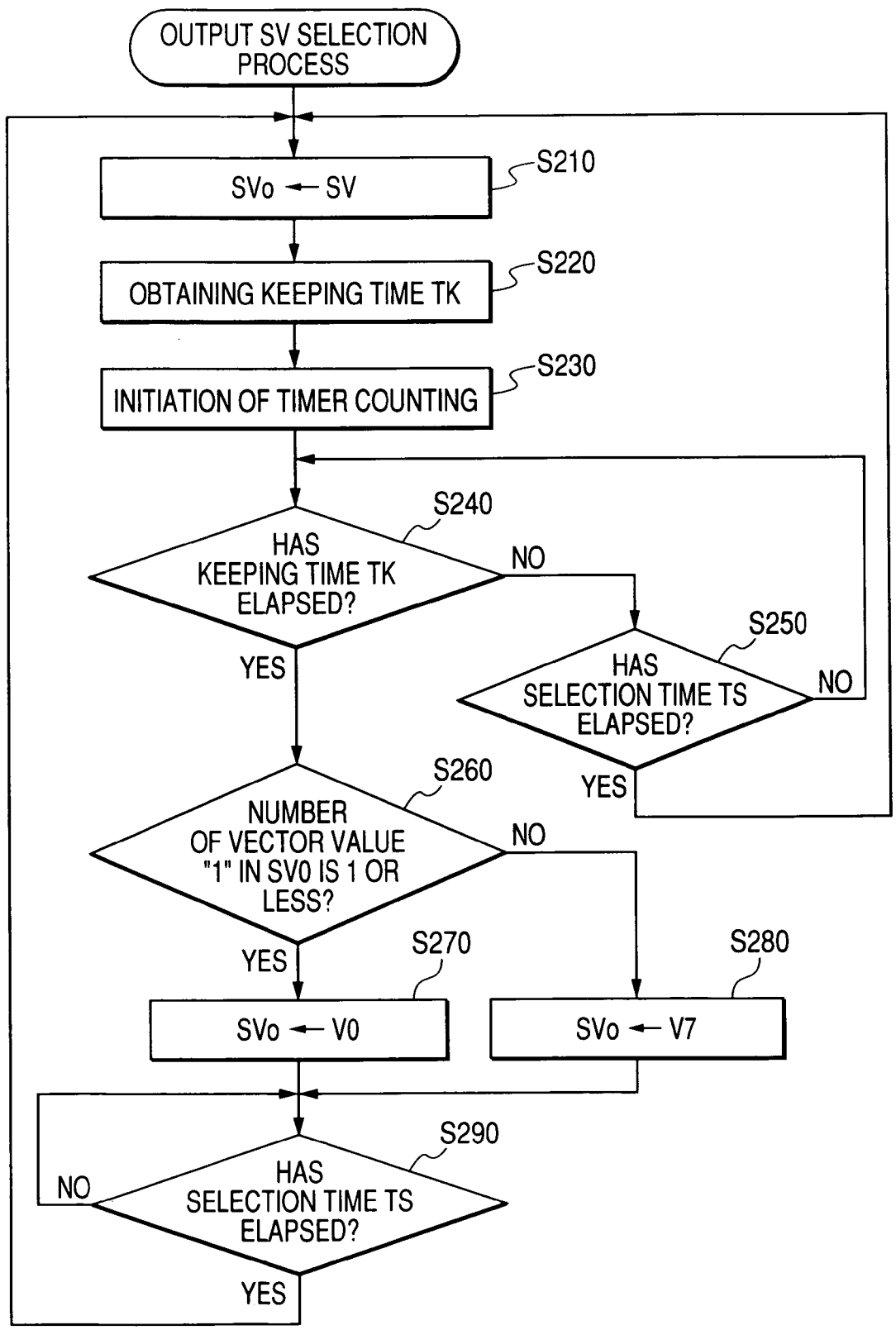
FIG. 5 is a flowchart showing the process of an output SV (switching vector) selection section in the inverter control device according to the first embodiment.

Next, the output SV selection section 15 performs the output SV selection process of selecting the output switching vector SVo to be supplied to the driving signal generation section 17 based on the switching vector SV (determined by the switching vector determination section 13) and the keeping time TK (set by the keeping time setting section 19) according to the flow chart shown in FIG. 5.

In the output SV selection process as shown in FIG. 5, the output SV selection section 15 selects firstly the switching vector SV that has been selected by the switching vector determination section 15 (S210).

Next, the output SV selection section 15 receives the keeping time TK transferred from the keeping time setting section 19 (S220) and starts counting the time with a timer (not shown) (S230).

The output SV selection section 15 judges whether or not the keeping time TK has elapsed (S240).

If the keeping time TK has not elapsed, the output SV selection section 15 judges whether or not a given selection time TS has elapsed from the initiation time of the count by the timer. (S250)

It is so set in advance that this selection time TS is equal in time to the iteration period to determine the switching vector by the switching vector determination section 13.

The judgment result in step S250 indicates that the given selection time TS has not elapsed, the operation flow returns to the step S240. On the contrary, if the judgment result indicates that the given selection time TS has elapsed or the keeping time TK becomes longer than the selection time TS, the operation flow returns to the initial step S210 without performing steps S260 to S290.

When judging the keeping time TK has elapsed, namely if the keeping time TK obtained is shorter than the selection time TS in the previous step S240, the output SV selection section 15 further judges whether or not the number of the value "1" in the output switching vector SVo is one or less (1 or less) (S260). The judgment result indicates that its number is one or less, the output SV selection section 15 selects the zero vector V0 of all zero as the output switching vector SVo (S270). When the judgment result indicates that its number is two or more, the output SV selection section 15 selects the zero vector V7 of all "1" as the output switching vector SVo (S280).

The output SV selection section 15 then performs no operation until the selection time TS has elapsed (S290). After the selection time TS has elapsed, the operation flow returns to step S210 and the output SV selection section 15 performs the iteration of steps S210 to S280.

The keeping time setting section 19 calculates a torque of the electric motor MG based on the detection current values iu, iv, and iw detected by the current detection circuit 9. Further, the keeping time setting section 19 calculates a revolution speed of the electric motor MG based on a detection position P detected by the revolution position detection circuit 8. The keeping time setting section 19 then sets the keeping time TK according to the calculated torque and the calculated revolution speed using a table (not shown) that is set in advance.

The value of the keeping time TK is increased according to the increasing of the torque and the revolution speed of the electric motor MG. In the case that those torque and the revolution speed are over a corresponding given value set in advance, the keeping time TK is set to the value that is longer in time than the selection time TS. That is, according to the present invention, the output SV selection section 15 updates the output switching vector SVo with the switching vector SV obtained from the switching vector determination section 13 every selection time TS. In particular, under a low revolution speed or a low load of the electric motor MG (TK<TS), the output SV selection section 15 selects and outputs the zero vector V0 or V7 at the timing when the keeping time TK has elapsed after the updating for the output switching vector SVo.

Next, the driving signal generation section 17 generates the driving signals UP, UN, VP, VN, WP, and WN based on the output switching vector SVo. The driving signals XP (X=U, V, and P) drive the switching elements SWp (p=a, c, and e) connected to the positive electrode of the DC power supply 3 and the X phase (X=U phase, V phase, and P phase) of the electric motor MG. On the other hand, the driving signals XN (X=U, V, and P) drive the switching elements SWn (n=b, d, and f) connected to the negative electrode of the DC power supply 3 and the X phase (X=U phase, V phase, and P phase) of the electric motor MG.

The driving signal generation section 17 inserts a dead time at which the pairs of the switching elements SWp and SWn forming the switching element pairs PSU, PSV, and PSW are not OFF simultaneously when the ON and OFF states of the switching element pairs PSU, PSV, and PSW are reversed in order to prevent a short circuit between the electric power supply lines connected to the DC power supply 3.

Figure 6:
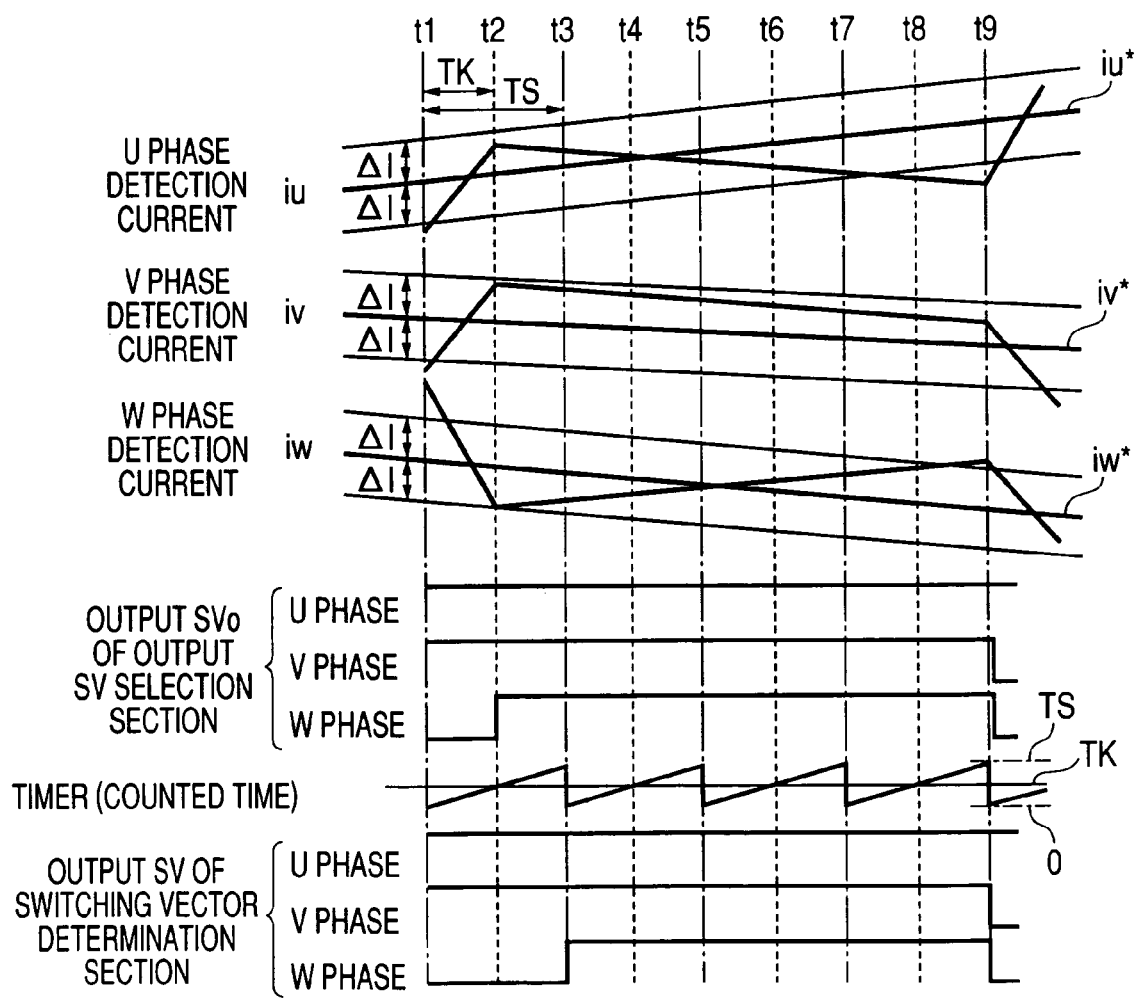
FIG. 6 is a timing chart showing the operation of both the inverter shown in FIG. 1A and the inverter control device shown in FIG. 1B according to the first embodiment.

FIG. 6 is a timing chart showing the operation of both the inverter 1 shown in FIG. 1A and the inverter control device 10 shown in FIG. 1B according to the first embodiment.

A description will be given of the operation of the inverter 1 under the control of the inverter control device 10 with reference to the timing chart of FIG. 6 showing a low revolution speed of the electric motor in which the keeping time TK is shorter than the selection time TS.

At the timing t1 shown in FIG. 6, the deviation signals takes the value (du, dv, dw)=(2, 2, 0) based on the relationship between the detection currents iu, iv, and iw and the current instruction values iu*, iv*, and iw*. Accordingly, the switching vector determination section 13 outputs the switching vector SV=V6 (=[110]) and the output SV selection section 15 outputs the switching vector SVo=V6. The magnitude of the current flowing in the coil winding of each of the phases U and V phases of the electric motor MG thereby increase and the magnitude of the current flowing in the oil winding of the W phase of the electric motor MG decreases.

At the timing t2 after the elapse of the keeping time TK counted from the timing t1, the output SV selection section 15 selects the zero vector V7 by which the minimum number of the switching instead of the currently output switching vector SVo=V6. As a result, the change of the magnitude of the current flowing in each phase is suppressed.

At the timing t3 after the elapse of the selection time TS counted from the timing t1, because the deviation signal becomes (du, dv, dw)=(1, 1, 1), the switching vector determination section 13 selects and outputs the switching vector SV=V7, and the output SV selection section 15 thereby outputs the switching vector SVo=V7. That is, at the timing t3, no switching occurs and the change of the magnitude of the current flowing in each phase is suppressed.

At the timing t4 after the elapse of the keeping time TK counted from the timing t3, because the switching vector determination section 13 outputs the switching vector SVo=V7, the output SV selection section 15 selects the switching vector SVo=V7 as zero vector. That is, no switching occurs at the timing t4. It is kept that the change of the magnitude of the current flowing in each phase is suppressed.

At the timing t5 after the elapse of the selection time TS counted from the timing t4, and at the timing t7 after the elapse of the selection time TS counted from the timing t5, because the deviation signal becomes (du, dv, dw)=(1, 1, 1), the same operation at the timing t3 is performed at both the timings t5 and t7. In addition, the same operation at the timing t4 is performed at both the timings t6 and t8 after the elapse of the keeping time TK counted from the timing t5 and at the timing t7, respectively.

At the timing t9 after the elapse of the selection time TS counted from the timing t7, because the deviation signal becomes (du, dv, dw)=(2, 1, 0), the switching vector determination section 13 outputs the switching vector SV=V4=(1 0 0), the output SV selection section 15 selects the switching vector SVo=V4. That is, because the switching occurs at the timing t9, the magnitude of the current flowing in the coil winding of the U phase of the electric motor MG increases and on the contrary the magnitude of the current flowing in each coil winding of the V phase and the W phase decreases.

In a high revolution speed of the electric motor MG in which it is so set that the keeping time is longer in time than the selection time TS, the switching vector SV selected by the switching vector selection section 13 becomes the output switching vector SVo output from the output SV selection section 15 every the elapse of the selection time TS.

As described above in detail, in the inverter control device 10 of the first embodiment shown in FIG. 1B, the output switching vector SVo is updated based on the switching vector SV determined by the switching vector determination section 13. Further, during the low revolution speed of the electric motor MG in which it is so set that the keeping time TK is smaller in time than the selection time TS, the zero vector V0 and V7 is selected as the output switching vector SVo every the elapse of the keeping time TK counted from the updating timing of the output switching vector SVo regardless of the magnitude of the detected current values iu, iv, and iw.

According to the inverter control device 10 of the first embodiment of the present invention, because the zero vector V0 and V7 is selected during the low revolution speed of the electric motor MG, it is thereby possible to suppress the change of the magnitude of the current flowing in the coil winding of each phase of the electric motor MG. In particular, it is possible to reduce occurrence of the large current that exceeds the given value, namely a standard current level ΔI during the selection time TS.

As a result, it is possible to reduce the number of the switching of the inverter 1, namely the switching loss of the inverter during the low revolution speed of the electric motor MG. Further, because the switching loss can be reduced, a switching element of a relatively low rated can be available for each of the switching element SWa to SWf that forms the inverter 1 shown in FIG. 1A. This can further enhance the freedom of inverter design.

Furthermore, the inverter control device 10 changes and sets the keeping time TK according to the torque and the revolution speed of the electric motor MG. During a high revolution speed, it can be so set that the keeping time TK is longer than the selection time TS in order to prevent selecting the zero vector. Therefore the inverter control device 10 of the first embodiment of the present invention can be used without causing any problem during a high revolution speed of the electric motor MG that needs no zero vector such as V0 and V7.

The inverter control device 10 can be applied to the wide use from the high revolution speed to the low revolution speed of the electric motor MG.

In the inverter control device according to the first embodiment, although the update timing, namely the selection time TS of the output switching vector SVo is set to a constant value, the present invention is not limited by this configuration. It is possible to set the selection time TS to a variable value, like the keeping time TK based on the magnitude of the torque and the revolution speed of the electric motor MG, for example.

Furthermore, in the first embodiment of the present invention, the current deviation detection section 11 corresponds to a current deviation detection means, the comparators 11a to 11c correspond to a first comparison means, the switching vector determination section 13 corresponds to a switching vector determination section, the output SV selection section 15 corresponds to a selection means, the driving signal generation section 17 corresponds to an inverter driving means, and the keeping time setting section 19 corresponds to a keeping time setting means.

Second Embodiment

A description will now be given of the second embodiment according to the present invention.

The difference between the first embodiment and the second embodiment is a configuration of the inverter control device. The inverter 1 and the electric motor MG and other components are the same of those of the first embodiment. The explanation of the same components is therefore omitted here.

Figure 7A:
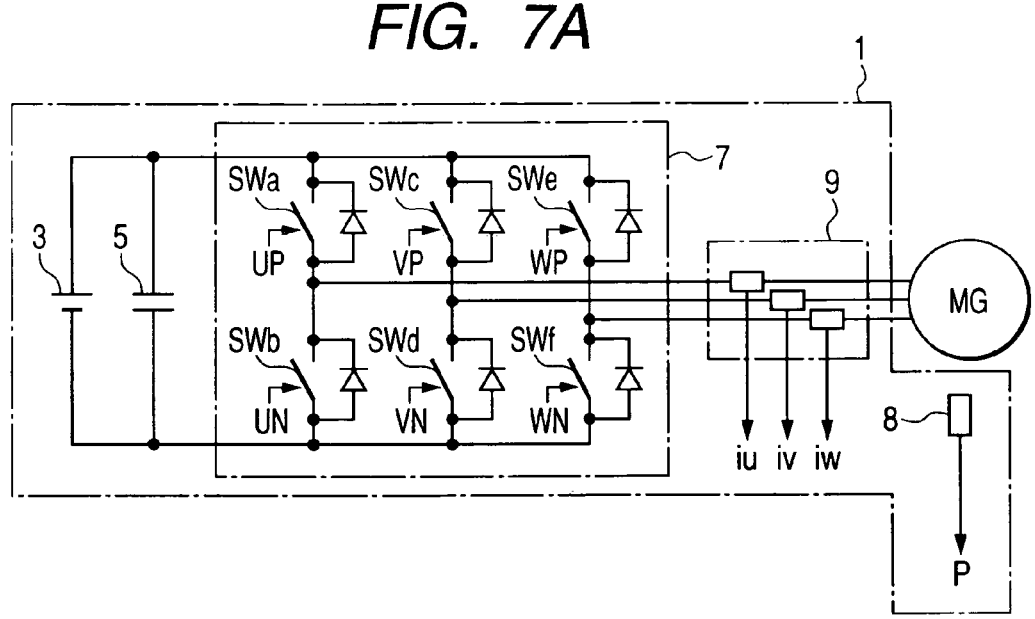
FIG. 7A is a block diagram showing a configuration of an inverter to be controlled by an inverter control device according to a second embodiment of the present invention.
Figure 7B:
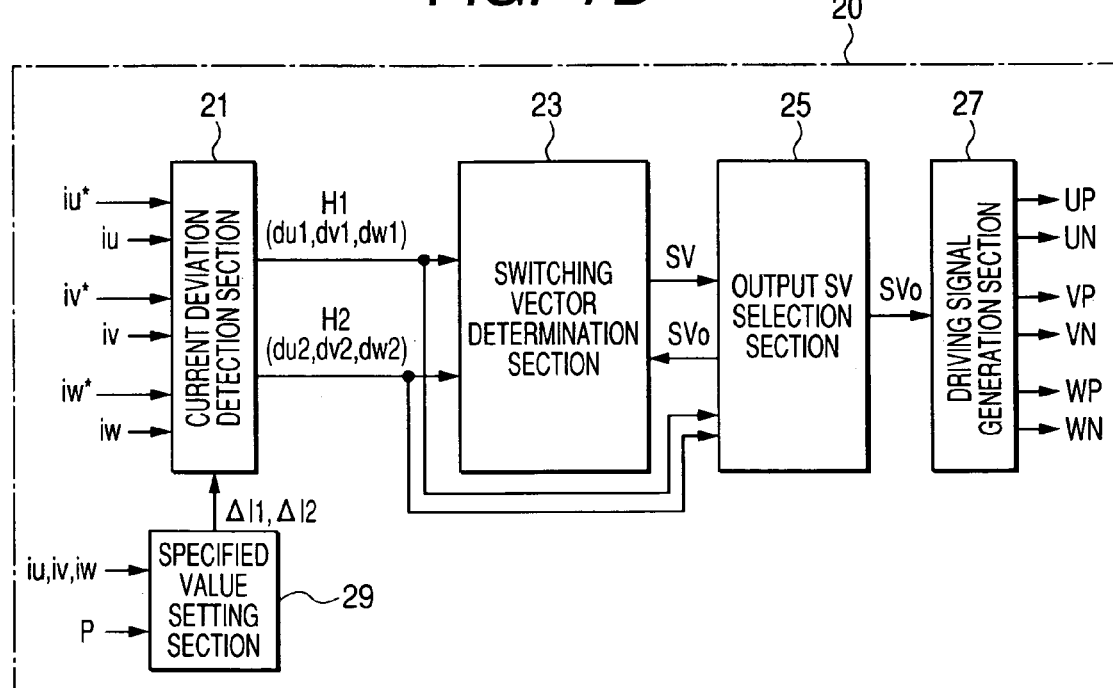
FIG. 7B is a block diagram showing a circuit configuration of the inverter control circuit according to the second embodiment.

The inverter control device 20 shown in FIG. 7B has the current deviation detection section 21, the switching vector determination section 23, the output SV selection section 25, the driving signal generation section 27, and the specified value setting section 29.

The current deviation detection section 21 generates first deviation signal H1 (du1, dv1, and dw1) and second deviation signal H2 (du2, dv2, and dw2) based on the current values iu, iv, and iw detected by the current detection circuit 9 and the current instruction values iu*, iv* and iw* that have been given in advance, respectively.

The switching vector determination section 23 determines a switching vector SV according to the first and second deviation signals H1 and H2 detected by the current deviation detection section 21.

The output SV (switching vector) selection section 25 selects as the output switching vector SVo one of the switching vector SV determined by the switching vector determination section 23. The output SV (switching vector) selection section 25 selects a zero vector as a switching vector by which the voltage difference between phases of the electric motor MG is set to zero.

The driving signal generation section 27 generates driving signals UP, UN, VP, VN, WP, and WN for switching each switching element SWa to SWf forming the three phase bridge circuit 7 according to the output switching vector SVo selected by the output SV selection section 25.

The specified value setting section 29 sets a first specified value ΔI1 and a second specified value ΔI2 to be used for generating the first deviation signal H1 and the second deviation signal H2 by the current deviation detection section 21 according to both the detected current values iu, iv, and iw detected by the current detection circuit 9 and the detection position P detected by the revolution position detection circuit 8.

Figure 8A:
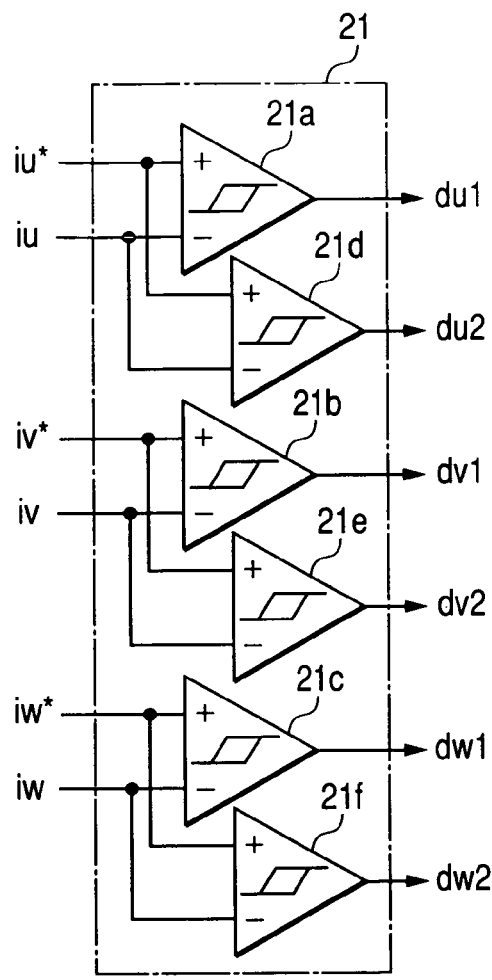
FIG. 8A is a circuit diagram showing a configuration of a current deviation detection section in the inverter control device according to the second embodiment.

As shown in FIG. 8A, the current deviation detection section 21 has the three level comparators 21a to 21c that are the same as the comparators forming the current deviation detection section 11 of the first embodiment and additional three comparators 21d to 21f.

The three level comparators 21a to 21c and the additional three comparators 21d to 21f have the same configuration and different threshold values. That is, the three comparators 21a to 21c are different in threshold value from the additional three comparators 21d to 21f.

The comparators 21a and 21d input the current instruction value iu* and the current detection value iu of the U phase, and outputs the first deviation signal du1 and the second deviation signal du2 having a level corresponding to the difference (iu*−iu) between the value iu* and the value iu.

The comparators 21b and 21e input the current instruction value iv* and the current detection value iv of the V phase, and outputs the first deviation signal dv1 and the second deviation signal dv2 having a level corresponding to the difference (iv*−iv) between the value iv* and the value iv.

The comparators 21c and 21f input the current instruction value iw* and the current detection value iw of the W phase, and outputs the first deviation signal dw1 and the second deviation signal dw2 having a level corresponding to the difference (iw*−iw) between the value iw* and the value iw.

Figure 8B:
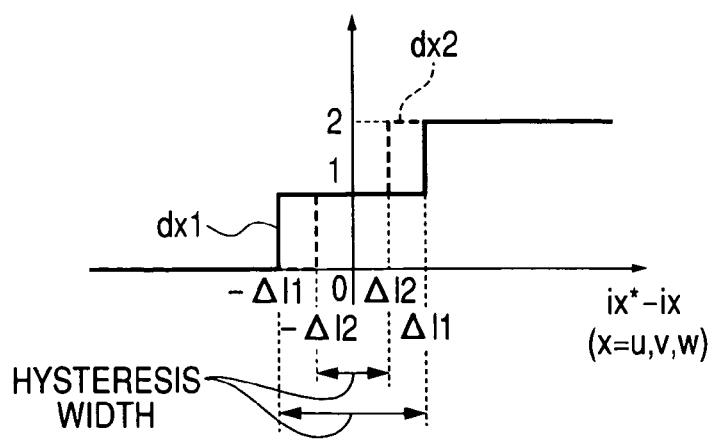
FIG. 8B is a diagram showing three level outputs of a three level comparator in the current deviation detection section shown in FIG. 8A.

As shown in FIG. 8B, the first deviation signal dx1 (x=u, v, w) takes three levels. The three levels are dx1=0 (the large level) when ix*−ix≧−ΔI1, dx1=1 (the middle level) when |ix*−ix|<ΔI1, and dx1=2 (the small level) when ix*−ix≧ΔI1, where the first specified value to be the threshold value of the comparators 21a to 21c is ΔI1. The second deviation signal dx2 (x=u, v, w) takes three levels. The three levels are dx2=0 (the large level) when ix*−ix ≦−ΔI2, dx2=1 (the middle level) when |ix*−ix|<ΔI2, and dx2=2 (the small level) when ix*−ix≧ΔI2, wherein the second specified value to be the threshold value of the comparators 21d to 21f is ΔI2. In particular, FIG. 8B shows the case of ΔI1>ΔI2.

The specified value setting section 29 calculates a torque of the electric motor MG based on the detection current values iu, iv, and iw detected by the current detection circuit 9, and calculates a revolution speed of the electric motor MG based on the detection position P detected by the revolution position detection circuit 8.

Further, the specified value setting section 29 sets the first and second specified values ΔI1 and ΔI2 using the table that is prepared in advance and the torque and the revolution speed value calculated.

In the second embodiment, the first specified value ΔI1 is a fixed value, and the second specified value ΔI2 that is increased according to the increasing of the torque and the revolution speed, and it is so set that the second specified value ΔI2 is greater than the first specified value ΔI1 when the torque and the revolution speed exceed a corresponding specified threshold value.

Next, the switching vector determination section 23 has a vector determination table shown in FIG. 9A therein and performs the switching vector determination process to determine the switching vector SV according to the flow chart shown in FIG. 4.

Similar to the first embodiment, the switching vector SV (and also the output switching vector SVo) has eight values V0 to V7.

As shown in FIG. 9A, the vector determination table shows the first deviation signal du1, dv1, and dw1 instead of the deviation signals du, dv, and dw shown in FIG. 3A. When all of the first deviation signal du1, dv1i, and dw1 take the value "1" indicating the middle level, the switching vector determination section 23 selects the switching vector SV based on an auxiliary table shown in FIG. 9B.

Further, in the auxiliary table FIG. 9B, the switching vector determination section 23 selects the switching vector V0 when all of the second deviation signals du2, dv2, and dw2 take the value "1" indicating the middle level, and selects the preceding vector when the second deviation signals du2, dv2, and dw2 take the value other than the value "1".

Figure 10:
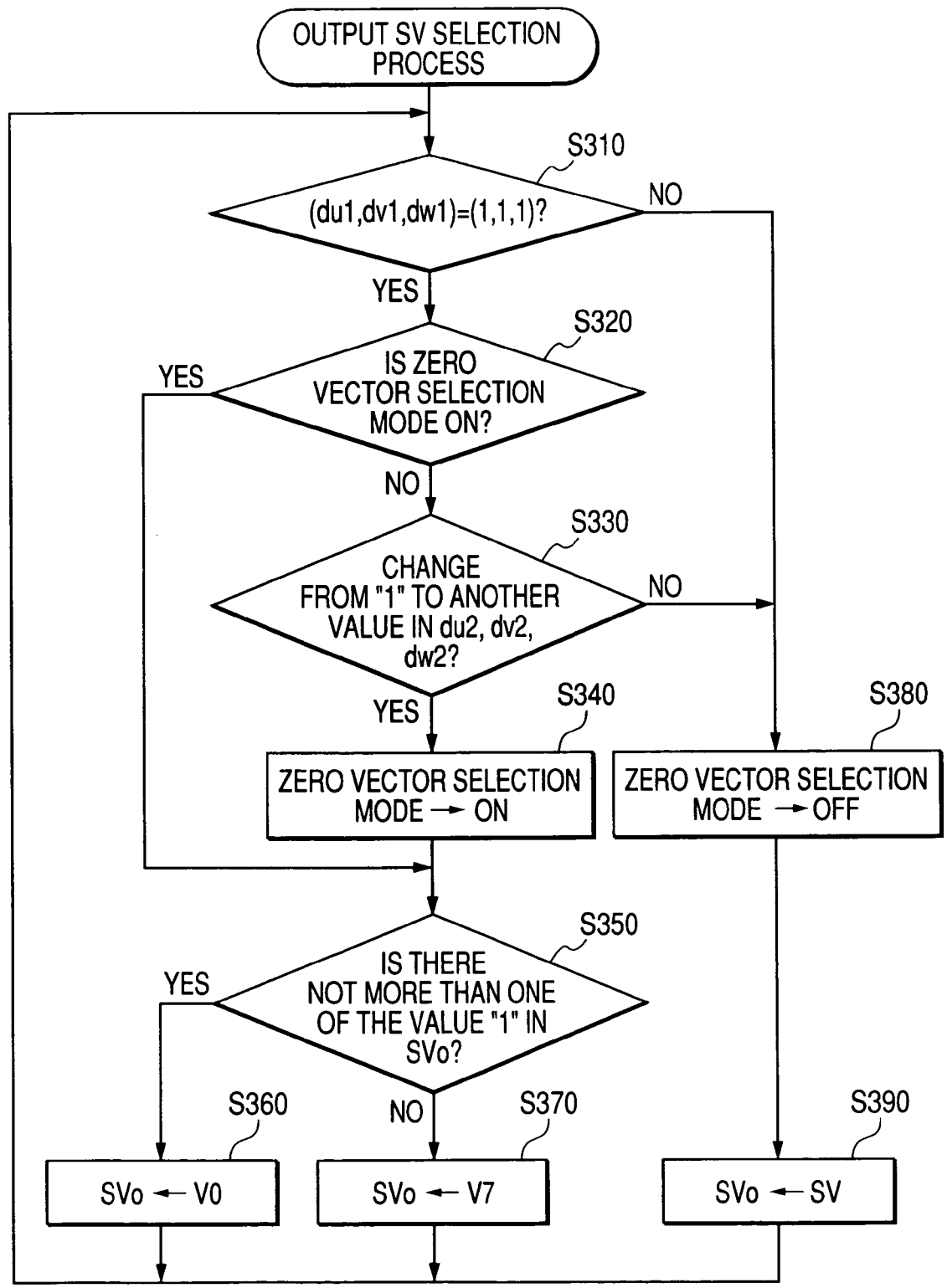
FIG. 10 is a flowchart showing the process of an output SV (switching vector) selection section in the inverter control device according to the second embodiment.

Next, the output SV selection section 25 performs the output SV selection process of selecting the output switching vector SVo to be supplied to the driving signal generation section 27 based on the switching vector SV (determined by the switching vector determination section 23) and the first and second specified values (set by the specified value setting section 29) according to the flow chart shown in FIG. 10.

At first, as shown in FIG. 10, the switching vector determination section 23 judges whether or not all of the first deviation signals are the value "1". (S310)

If at least one of the first deviation signals du1, dv1, and dw1 takes a value other than the value "1", the switching vector determination section 23 sets the zero vector selection mode (S380) to "OFF", and the output SV selection section 25 selects the switching vector SV determined by the switching vector determination section 23 as the output switching vector SVo (S390), and the operation flow returns to S310.

On the other hand, all of the first deviation signals du1, dv1, and dw1 take the value "1" as a result of step S310, the output SV selection section 25 checks whether the zero vector selection mode is "ON" or "OFF" (S320). If it is "OFF", the output SV selection section 25 further checks the change history of the second deviation signals du2, dv2, and dw2 from the value "1" to another value (S330).

When there is no presence to change from the value "1" to another value in the second deviation signals du2, dv2, and dw2, the zero vector selection mode is set to "OFF" (S380), and the output SV selection section 25 selects the switching vector SV determined by the switching vector determination section 23 as the output switching vector SVo (S390). The operation flow thereby returns to step S310.

On the contrary, there is the presence to change from the value "1" to another value in at least one of the second deviation signals du2, dv2, and dw2, the zero vector selection mode is set to "ON" (S340).

It is checked whether or not there is one or no element of the value "1" in the currently output switching vector SVo. When there is one or no element of the value "1", the zero vector having all zero is selected as the output switching vector SVo (S360). When there are two or more of the elements of the value "1", the zero vector having all of the value "1" is selected as the output switching vector SVo (S370).

In the previous step S320, when the judgment result indicates that the zero vector selection mode is "ON", the operation flow goes to step S350. In step S350, as described above in detail, the output switching vector SVo is updated with the zero vector V0 or V7 selected based on the currently output switching vector SVo (steps S350 to S370). The operation flow returns to step S310.

When the second specified value ΔI2 is greater than the first specified value ΔI1, step S330 always judges NO, so that there is no possibility to set the zero vector selection mode to "ON", namely, the operation flow always goes to step S380.

Next, the driving signal generation section 27 generates the driving signals UP, UN, VP, VN, WP, and WN according to the output switching vector SVo. The operation of the driving signal generation section 27 is the same as that of the driving signal generation section 17 in the first embodiment. The explanation thereof is omitted here for brevity.

Figure 11:
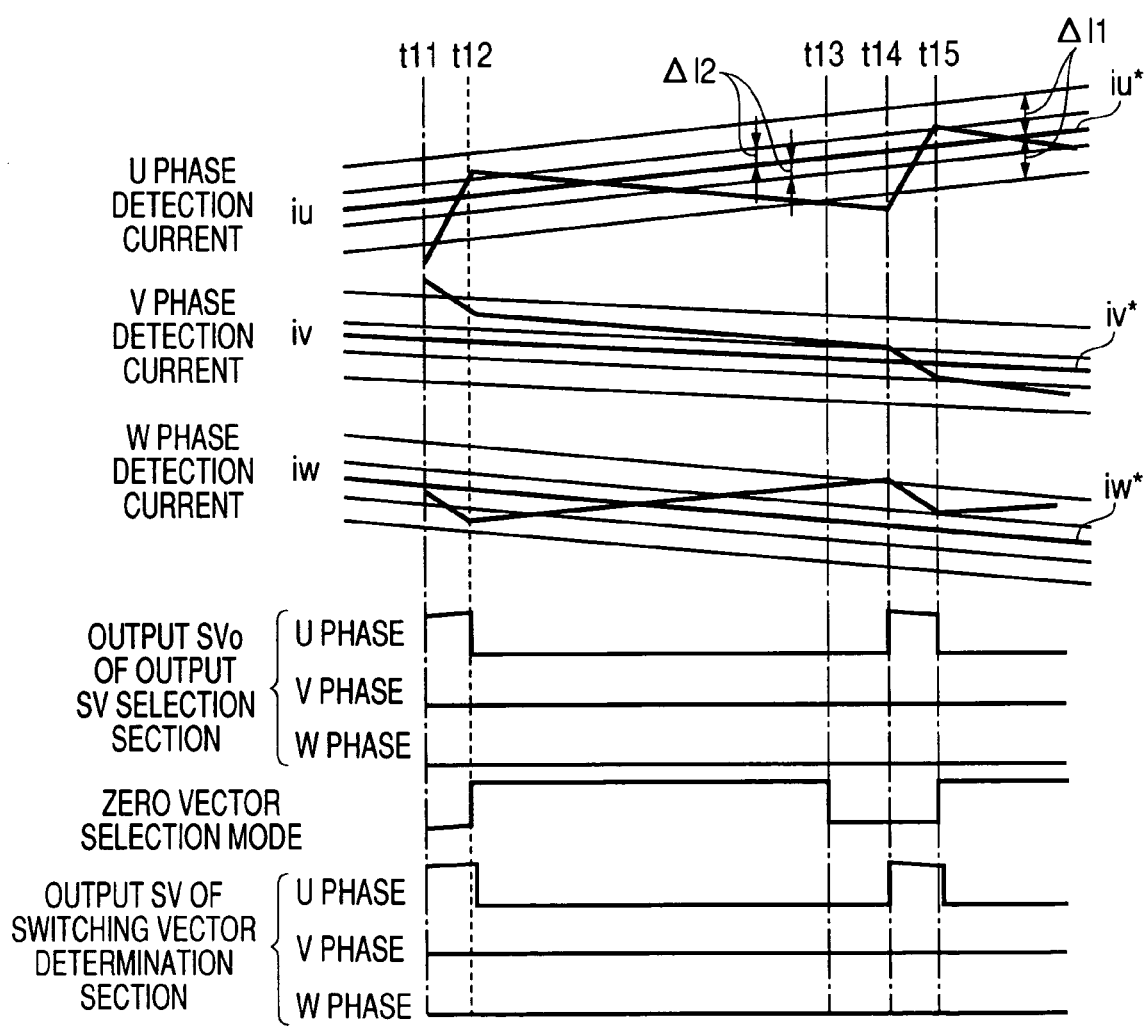
FIG. 11 is a timing chart showing the operation of both the inverter shown in FIG. 7A and the inverter control device shown in FIG. 7B according to the second embodiment.
Figure 12A:
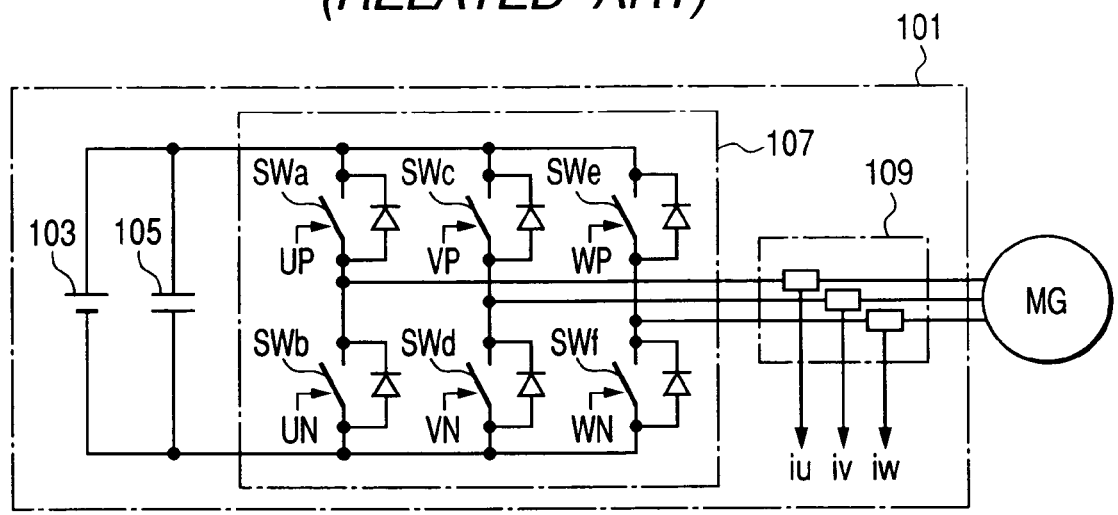
FIG. 12A is a block diagram showing a configuration of an inverter to be controlled by an inverter control device of a related art.
Figure 12B:
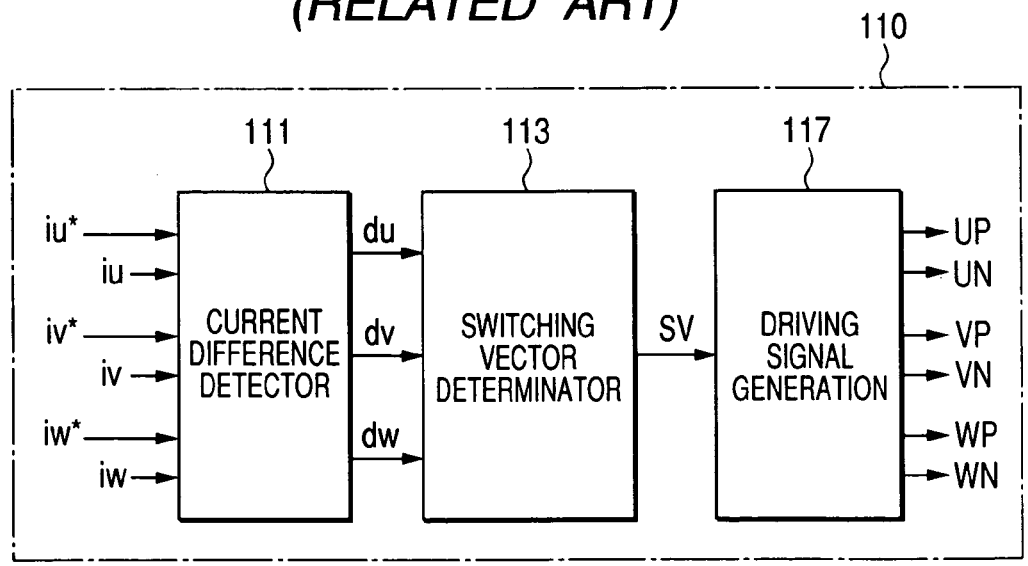
FIG. 12B is a block diagram showing a circuit configuration of the inverter control circuit of the related art.

A description will now be given of the operation of the inverter 1 under the control of the inverter control device 20 with reference to the timing chart of FIG. 11 showing a low revolution speed of the electric motor MG in which the second specified value ΔI2 is smaller than the first specified value ΔI1.

In the following, the range between the value $(ix^*-\Delta I1)$ and the value $(ix^*+\Delta I1)$ that are determined using the first specified value ΔI1 about the instruction value $ix^*$ will be referred to as "a first hysteresis area", and the range between the value $(ix^*-\Delta I2)$ and the value $(ix^*+\Delta I2)$ that are determined using the second specified value ΔI2 about the instruction value $ix^*$ will be referred to as "a second hysteresis area".

At the timing t11 shown in FIG. 11, the first deviation signals takes the value (du1, dv1, dw1)=(2, 0, 1), the second deviation signals takes the value (du2, dv2, dw2)=(2, 0, 1). Thereby, the switching vector determination section 23 outputs the switching vector SV=V4 (=100) (hereinafter, referred to as the determination switching vector).

At this time, because the result of the output SV selection process S320 provides NO, and as a result the zero vector selection mode becomes "OFF" in step S380, the output SV selection section 25 outputs the output switching vector SVo=SV4.

The current flowing in the coil winding of the phase U of the electric motor MG is thereby increased, and the current flowing in the coil winding of each of the phases V and W other than the phase U is decreased. As a result, the detection currents iu and iv flowing in the U and V phases enters the first hysteresis area. At this time, because the result of the output SV selection process S330 provides that the zero vector selection mode is set to "ON", there is no change of the output switching vector SVo.

At the timing t12, the first deviation signals becomes (du1, dv1, dw1)=(1, 1, 1) and the second deviation signals becomes (du2, dv2, dw2)=(0, 0, 2). That is, the detection currents iu and iw flowing in the U phase and the W phase crosses the boundary of the second hysteresis between the timings t11 and t12, then out of the second hysteresis area at the timing t12. Because the output SV selection process of step S330 provides YES, the zero vector selection mode becomes "ON" at the step S340. Simultaneously, the currently output switching vector SVo=V4 is replaced with the zero vector V0 of the minimum switching number as the newly output switching vector SVo. The change of the current flowing in the coil winding of each phase is thereby suppressed.

Because the first deviation signal becomes (du1, dv1, dw1)=(1, 1, 1) and the zero vector selection mode is "ON" between the timing t12 and the timing t13, the output SV selection process in S320 and S330 provide "ON" as the result. As a result, the output switching vector SVo=V0 is kept between the timing t12 and the timing t13.

At the timing t13 shown in FIG. 11, the first deviation signals becomes (du1, dv1, dw1)=(2, 1, 1) and the second deviation signals becomes (du2, dv2, dw2)=(2, 0, 0). Thereby, the currently output switching vector SV is kept, that is SV=V0. At this time, because the result of the output SV selection process S310 provides NO and the result of the zero vector selection mode becomes "OFF", the output switching vector becomes SVo=V0.

At the timing t14, the first deviation signals becomes (du1, dv1, dw1)=(2, 1, 0) and the second deviation signals becomes (du2, dv2, dw2)=(2, 0, 0). Thereby, the currently output switching vector becomes SV=V4. At this time, because the result of the output SV selection process S310 provide NO and the result of the zero vector selection mode becomes "OFF" at the step S380, the output switching vector becomes SVo=V4. The magnitude of the current flowing in the coil winding of the phase U is increased and the magnitude of the current flowing in the coil winding of each of the phases V and W is decreased.

At the timing t15 shown in FIG. 11, the first deviation signals becomes (du1, dv1, dw1)=(1, 1, 1) and the second deviation signals becomes (du2, dv2, dw2)=(0, 1, 0). That is, the detection current iu flowing in the U phase crosses the boundary of the second hysteresis area between the timings t14 and t15, then out of the second hysteresis area at the timing t15. Because the output SV selection process of step S330 provides YES, the zero vector selection mode becomes "ON" at the step S340. Simultaneously, the currently output switching vector SVo=V4 is replaced with the zero vector V0 of the minimum switching number as the newly output switching vector SVo. The change of the current flowing in the coil winding of each phase is thereby suppressed.

During a high revolution speed in which it is so set that the second specified value ΔI2 is greater than the first specified value ΔI1, the zero vector selection mode does not become "ON" because the step S330 always selects NO. As a result, the output SV selection section 25 outputs the switching vector SV determined by the switching vector determination section 23 as the output switching vector SVo.

As described above, the inverter control device 20 of the second embodiment sets the zero vector selection mode to "ON" and the zero vector V0 or V7 is selected as the output switching vector when at least one of the detection currents iu, iv, and iw is out of the second hysteresis area from the state where all of the detection currents iu, iv, and iw are in the first hysteresis area, and all of the detection currents iu, iv, and iw are kept within the first hysteresis area.

Accordingly, the inverter control device 20 can maintain the operation state for a long time period, in which the all of the detection currents iu, iv, and iw are within the first hysteresis area and the zero vector V0 or V7 is selected as the output switching vector SVo.

Further, the first specified value ΔI1 and the second specified value ΔI2 are so set that the area in the first hysteresis area and out from the second hysteresis area is expanded in the lower revolution speed of the electric motor MG. Therefore when the electric motor MG operates at a lower revolution speed, it is kept for a log time to be the detection currents iu, iv, and iw in the first hysteresis area.

As a result, like the effects of the first embodiment, it is possible to reduce the number of the switching and further to reduce the switching loss of the inverter 1 at a low revolution speed of the electric motor MG.

Further, because the switching loss can be reduced, it is possible to use relatively low rated elements as the switching elements SWa to SWf forming the inverter 1. Furthermore, because a relatively looser limitation can be applied to the selection of the switching elements SWa to SWf, the freedom of design cab be enhanced.

Further, during a high revolution speed of the electric motor MG, because it is so set that the second specified value ΔI2 is greater than the first specified value ΔI1, the zero vector selection mode is always set to "OFF". The inverter control device of the present invention can be used during a high revolution speed of the electric motor MG without causing any problem. Therefore it is possible to apply the inverter control device of the present invention to the extensive use from a high revolution speed to a low revolution speed.

Although the second embodiment uses the fixed first specified value ΔI1, the present invention is not limited by this, for example, it is acceptable to change the first specified value ΔI1 according to the revolution speed and the torque of the electric motor MG, like the second specified value ΔI 2.

The relationship between the second embodiment and the following claims is as follows. The current deviation detection section 21 corresponds to the current deviation detection means, the comparators 21a to 21c correspond to the first comparison means, the comparator 21d to 21f correspond to the second comparison means, the switching vector determination means 23 corresponds to the switching vector determination means, the output SV selection section 25 corresponds to the selection means, the driving signal generation section 27 corresponds to the inverter driving means, and the specified value setting section 29 corresponds to the specified value setting means.

Features of the Present Invention

The current deviation detection means of the inverter control device according to the first scope of the present invention detects or calculates the deviation between the current detection value and the current instruction value every phase of the electric motor MG, where the current detection value is the value of the current flowing in the coil winding of each phase of the electric motor MG that is driven by the inverter. The switching vector determination means determines every elapse of a predetermined time the switching vector to be supplied to the inverter in order to reduce the deviation between the current detection value and the current instruction value every phase.

The selection means selects the switching vector determined by the switching vector determination means until the elapse of the keeping time that is set in advance from the time of the determination by the switching vector determination means, and selects the zero vector by which the voltage difference between each pair of the phases of the electric motor becomes zero until the time at which the switching vector determination means selects the following switching vector after the elapse of the keeping time.

The inverter driving means drives the inverter based on the switching vector selected by the switching vector selection means.

As described above, according to the inverter control device of the present invention, the zero vector is selected regardless of the magnitude of the detection current value. Even if the current change rate of the detection current is increased, it can be increased to have the opportunity to select the zero vector. As a result, the inverter control device of the present invention can reduce the number of switching of the switching elements forming the inverter and also thereby reduce the switching loss. Because this feature can relax the limitation to use or select available elements as the switching elements forming the inverter, it is possible to enhance the degree of freedom of the design for the inverter. That is, it is possible to form the inverter with switching elements of a low rated element.

According to the inverter control device of the present invention, it is possible for the keeping time setting means to set the keeping time based on a revolution speed and a torque of the electric motor.

In a concrete example, the length of the keeping time is increased according to the increase of the revolution speed and the torque of the electric motor. When the keeping time obtained is longer than a selection cycle of the switching vector by the switching vector determination means, without inserting or using any zero vector, the inverter is controlled based on the switching vector obtained every selection of the switching vector. In other word, the inverter control device of the present invention can be applied, without causing any problem, to the range of the high revolution speed of the electric motor that needs no zero vector.

Accordingly, the inverter control device of the present invention can be applied to a wide use such as an electric motor performing from a low revolution speed to a high revolution speed.

It is preferred to use the table storing the relation data items between the keeping time, and the rotation speed and the torque of the electric motor in order to fetch an optimum keeping time. Using such a table can set the keeping time in a short time.

It is possible that the current deviation detection means has the first comparison means that is configured to output three levels as the deviation between the current detection value and the specified current value. The three levels as the deviation are a first medium level, a large level, and a small level. The first medium level indicates that an absolute value of the deviation is smaller than a first specified value set in advance, the large level indicates that the current detection value is not less than the first specified value larger than the current instruction value, and the small level indicates that the current detection value is not more than the first specified value smaller than the current instruction value.

In this case having the first comparison means, the switching vector determination means selects the zero vector when the detection current value of each of all phases is in the first medium level, and selects the preceding switching vector, namely the same switching vector when the detection current value of each of a pair in all phases is in the first medium level. The selection manner to select the switching vector by the switching vector selection means according to the present invention is not limited by this manner.

Next, the current deviation detection means of the inverter control device according to the second scope of the present invention also detects the current values of the coil windings of the phases of the electric motor and calculates the deviation between the current detection value and the current instruction value every phase of the electric motor, where the current detection value is the value of the current flowing in the coil winding of each phase of the electric motor that is driven by the inverter. The switching vector determination means then determines the switching vector to be supplied to the inverter in order to reduce the deviation between the current detection value and the current instruction value.

The selection means selects the switching vector determined by the switching vector selection means while the zero vector selection condition that is given in advance is not satisfied or established, and selects the zero vector while the zero vector selection condition that is given in advance is satisfied or established.

The inverter driving means drives the inverter based on the switching vector selected by the switching vector selection means.

The current deviation detection means has the first comparison means and the second comparison means.

The first comparison means outputs a first medium level, a large level, and a small level as the deviation between the current detection value and the specified current value. The first medium level indicates that an absolute value of the deviation is smaller than a first specified value set in advance. The large level indicates that the current detection value is not less than the first specified value larger than the current instruction value. The small level indicates that the current detection value is not more than the first specified value smaller than the current instruction value. The second comparison means outputs a second medium level and not second medium level for each phase. The second medium level indicates that the absolute value of the deviation is smaller than a second specified value that is set in advance to being smaller than the first specified value.

The selection means judges that the zero vector selection condition is satisfied or established while the time period that the deviation of at least one phase is changed to the level other than the first medium level after the current of at least one phase is changed from the second medium level to another level other than the second medium level under the condition in which the detected deviations of all three phases are in the first medium level.

The inverter control device having the configuration described above has a greater opportunity to select the zero vector while the deviations of all phases are in the first medium level, and can reduce the number of switching of the switching elements in the inverter, like the first scope of the present invention.

In this case, the switching vector determination means selects the zero vector when the deviations of all three phases detected by the current deviation detection means are in the second medium level, selects the preceding switching vector when the deviations of all three phases are in the first medium level and the deviation of at least one phase in all three phases is in the second medium level, or when the deviations of a pair of all three phases are in the first level.

The present invention is not limited by the above manner of the switching vector determination means.

It is preferred that the specified value setting means sets the first and the second specified values according to the revolution speed and the torque of the electric motor. In this case, because the selection means does not select any zero vector when the second specified value is greater than the first specified value, the inverter is driven by using the switching vector determined every selection of the switching vector.

In a concrete example, it is acceptable that the second specified value is increased according to the increase of the revolution speed and the torque of the electric motor.

When the second specified value is greater than the first specified value, the selection means selects no zero vector, so that it is possible to apply the inverter control device to the use under the high revolution of the electric motor without causing any problem.

It is preferred to search the table storing the relation data items between the first specified value and the second specified value and the rotation speed and the torque of the electric motor in order to fetch an optimum first specified value and the second specified value in order to obtain and set the first specified value and the second specified value in a short time.

Further, in the inverter control devices according to both the first scope of and second scope of the present invention, it is preferred for the inverter driving means to add a dead timing by which a pair of the switching elements are OFF simultaneously when a pair of the switching elements connected to a phase is switched.

This configuration ensures against short-circuit a pair of the switching elements that is connected to the coil winding of a same phase. Accordingly, the inverter control device of the present invention can be applied to a wide use such as an electric motor operating from a low revolution speed to a high revolution speed.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalent thereof.

What is claimed is:

1. An inverter control device controlling an inverter by selecting a switching vector to be supplied to the inverter so that a detection current flowing in a coil winding of each phase of an electric motor follows a specified current value, the inverter control device comprising:

means configured to determine the switching vector every a given timing in order to decrease the deviation between a current flow value detected in a coil winding of each phase and a given current value, to select the switching vector until the elapse of a keeping time that is given in advance from the determination time of the switching vector, and to selects a zero switching vector by which a voltage difference between the coil windings of each pair of the phases becomes zero until a determination time to determine the newly switching vector after the elapse of the keeping time, and to drive the inverter based on the selected switching vector.

2. An inverter control device controlling an inverter by selecting a switching vector to be supplied to the inverter so that a detection current flowing in a coil winding of each phase of an electric motor follows a specified current value, the inverter control device comprising:

current deviation detection means configured to detect a current flowing in a coil winding of each phase of the electric motor driven by the inverter, and to obtain a deviation between the current detection value detected and a specified current value that is given in advance per each phase;

switching vector determination means configured to determine the switching vector every a given timing in order to decrease the deviation of each phase obtained by the current deviation detection means;

selection means configured to select the switching vector determined by the switching vector determination means until the elapse of a keeping time that is given in advance from the time at which the switching vector determination means determined the switching vector, and to selects a zero switching vector by which a voltage difference between each pair of the phases becomes zero until a time at which the switching vector determination means selects a new switching vector after the elapse of the keeping time; and inverter driving means configured to drive the inverter based on the switching vector selected by the selection means.

3. The inverter control device according to claim 2, wherein the inverter driving means adds a dead time at which all of the switching elements are OFF simultaneously when the switching state of a pair of the switching elements connected to the corresponding phase of the electric motor is switched.

4. The inverter control device according to claim 2, further comprising keeping time setting means configured to change and set the keeping time based on a revolution speed and a torque of the electric motor.

5. The inverter control device according to claim 4, wherein the keeping time setting means sets the keeping time by referring a table of storing relation data between the keeping time, the torque, and the revolution speed of the electric motor.

6. The inverter control device according to claim 2, wherein the current deviation detection means comprises first comparison means configured to output as the deviation between the current detection value and the specified current value, a first medium level, a large level, and a small level in which the first medium level indicates that an absolute value of the deviation is smaller than a first specified value set in advance, the large level indicates that the current detection value is not less than the first specified value larger than the current instruction value, and the small level indicates that the current detection value is not more than the first specified value smaller than the current instruction value.

7. The inverter control device according to claim 4, wherein the current deviation detection means comprises first comparison means configured to output as the deviation between the current detection value and the specified current value, a first medium level, a large level, and a small level in which the first medium level indicates that an absolute value of the deviation is smaller than a first specified value set in advance, the large level indicates that the current detection value is not less than the first specified value larger than the current instruction value, and the small level indicates that the current detection value is not more than the first specified value smaller than the current instruction value.

8. The inverter control device according to claim 5, wherein the current deviation detection means comprises first comparison means configured to output as the deviation between the current detection value and the specified current value, a first medium level, a large level, and a small level in which the first medium level indicates that an absolute value of the deviation is smaller than a first specified value set in advance, the large level indicates that the current detection value is not less than the first specified value larger than the current instruction value, and the small level indicates that the current detection value is not more than the first specified value smaller than the current instruction value.

9. The inverter control device according to claim 6, wherein the switching vector determination means selects the zero vector as the new switching vector when the detection result by the current deviation detection means outputs the medium level as the deviations of each of all phase, and selects the preceding switching vector as the new switching vector when the detection result by the current deviation detection means outputs the medium level as each deviation of two phases in the three phases of the electric motor.

10. The inverter control device according to claim 7, wherein the switching vector determination means selects the zero vector as the new switching vector when the detection result by the current deviation detection means outputs the medium level as the deviations of each of all phase, and selects the preceding switching vector as the new switching vector when the detection result by the current deviation detection means outputs the medium level as each deviation of two phases in the three phases of the electric motor.

11. The inverter control device according to claim 8, wherein the switching vector determination means selects the zero vector as the new switching vector when the detection result by the current deviation detection means outputs the medium level as the deviations of each of all phase, and selects the preceding switching vector as the new switching vector when the detection result by the current deviation detection means outputs the medium level as each deviation of two phases in the three phases of the electric motor.

12. An inverter control device controlling an inverter by selecting a switching vector to be supplied to the inverter so that a detection current flowing in a coil winding of each phase of an electric motor follows a specified current value, the inverter control device comprising:
　　current deviation detection means configured to detect a current flowing in a coil winding of each phase of the electric motor to be driven by the inverter, and obtain a deviation between the current detection value and a specified current value that is given in advance per each phase;
　　switching vector determination means configured to determine the switching vector in order to decrease the deviation of each phase obtained by the current deviation detection means;
　　selection means configured to select the switching vector determined by the switching vector determination means while a zero vector selection condition is not satisfied and to selects a zero switching vector by which a voltage difference between each pair of the phases becomes zero while the zero vector selection condition is satisfied; and
　　inverter driving means configured to drive the inverter based on the switching vector selected by the selection means,
　　wherein the current deviation detection means comprises:
　　first comparison means; and second comparison means, in which
　　　　the first comparison means is configured to output the a first medium level, a large level, and a small level as the deviation between the current detection value and the specified current value of each phase,
　　　　　　the first medium level indicates that an absolute value of the deviation is smaller than a first specified value set in advance,
　　　　　　the large level indicates that the current detection value is not less than the first specified value larger than the current instruction value, and
　　　　　　the small level indicates that the current detection value is not more than the first specified value smaller than the current instruction value, and
　　　　the second comparison means is configured to output a second medium level and non-second medium level for each phase, in which
　　　　the second medium level indicating that the absolute value of the deviation is smaller than the second specified value that is smaller than the first specified value, and the selection means determines that the zero vector selection condition is satisfied until the time at which the deviation of at least one phase is changed to another level other than the first medium level after the deviation of at least one phase is changed from the second medium level to another level other than the second medium level under the condition in which the current deviation detection means detects that the deviations of all of the phases are the first medium level.

13. The inverter control device according to claim 12, wherein the switching vector determination means selects the zero vector as the new switching vector when the deviation as the detection result of each of all phases by the current deviation detection means is in the second medium level, and selects the preceding switching vector as the new switching vector when the deviation of each of all phases is in the first medium level and the deviation of at least one phase is out of the second medium level, or when the deviations of at least a pair in all phases are in the first medium level.

14. The inverter control device according to claim 12, further comprising specified value setting means configured to set the first specified value and the second specified value based on a revolution speed and a torque of the electric motor.

15. The inverter control device according to claim 13, further comprising specified value setting means configured to set the first specified value and the second specified value based on a revolution speed and a torque of the electric motor.

16. The inverter control device according to claim 14, wherein the specified value setting means sets the first specified value and the second specified value by referring a table storing relation data between the specified values, the torque and the revolution speed of the electric motor.

17. The inverter control device according to claim 15, wherein the specified value setting means sets the first specified value and the second specified value by referring a table storing relation data between the specified values, the torque and the revolution speed of the electric motor.

18. The inverter control device according to claim 12, wherein the inverter driving means adds a dead time at which all of the switching elements are OFF simultaneously when the switching state of a pair of the switching elements connected to the corresponding phase of the electric motor is switched.

* * * * *